Nov. 28, 1967 — W. JAMES — 3,354,922
FUMEPROOF, TRANSPARENT ENCLOSURE FOR PREPARING ONIONS
Filed July 14, 1965 — 3 Sheets-Sheet 1
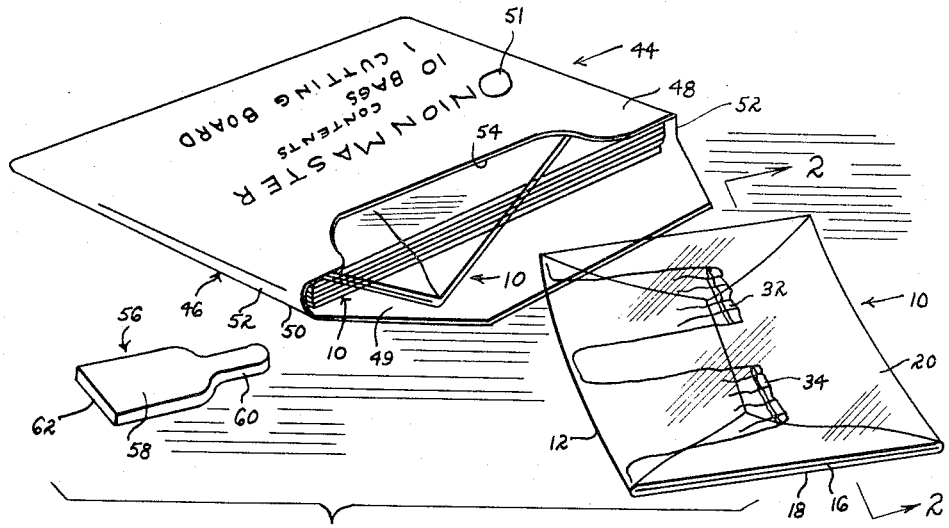
FIG. 1  FIG. 2
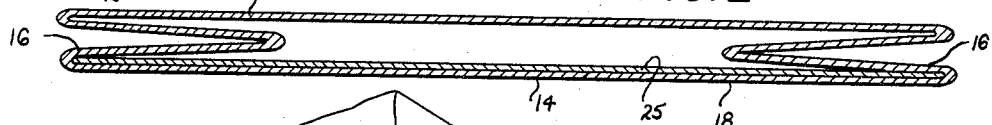
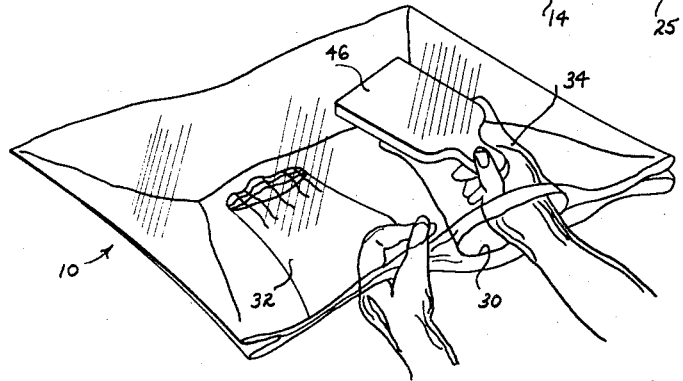
FIG. 3
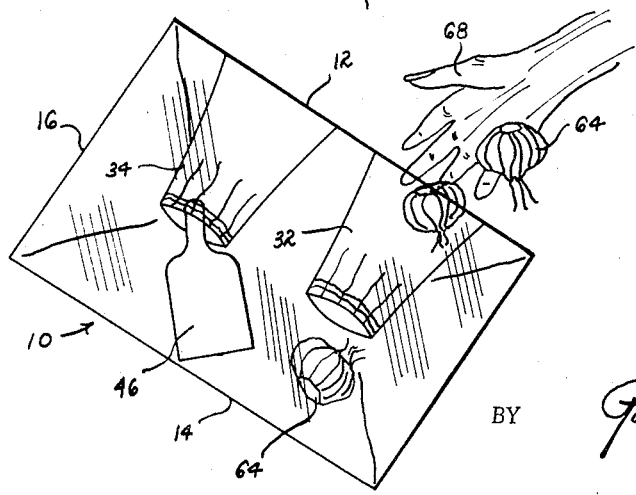
FIG. 4
INVENTOR
WILBERT JAMES
BY Polachek & Saulsbury
ATTORNEYS.

Nov. 28, 1967 W. JAMES 3,354,922
FUMEPROOF, TRANSPARENT ENCLOSURE FOR PREPARING ONIONS
Filed July 14, 1965 3 Sheets-Sheet 2

INVENTOR
WILBERT JAMES

BY Polachek & Saulsbury
ATTORNEYS.

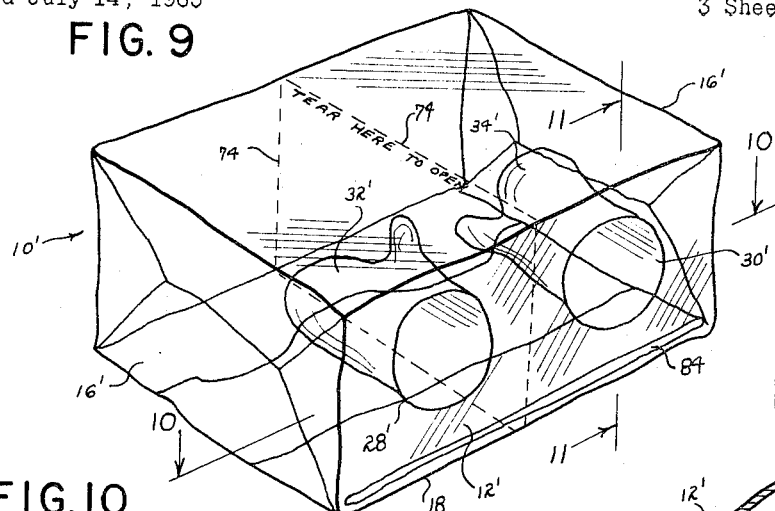
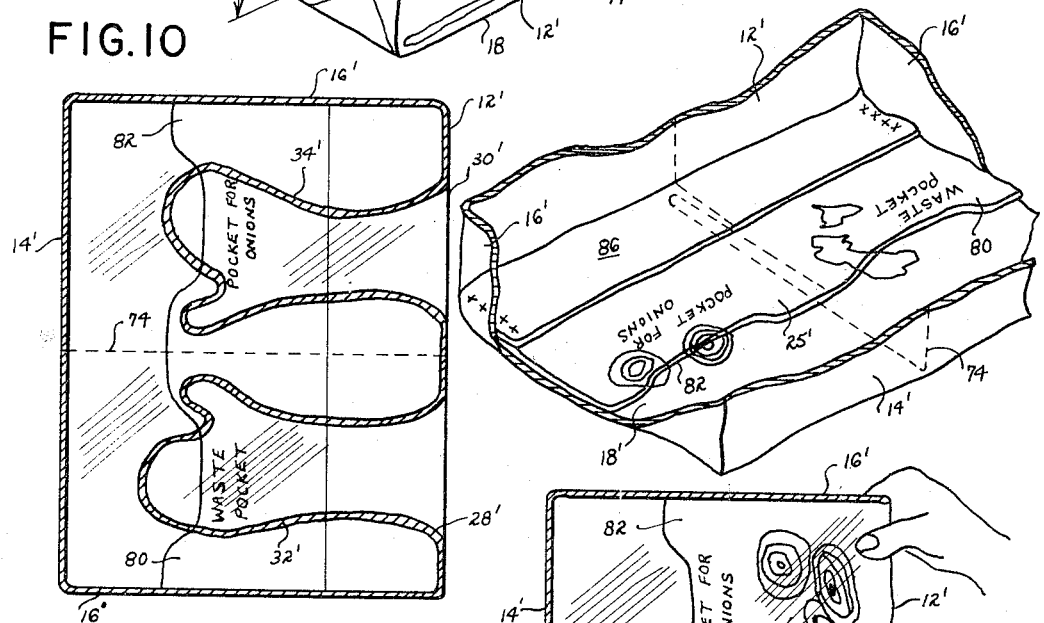
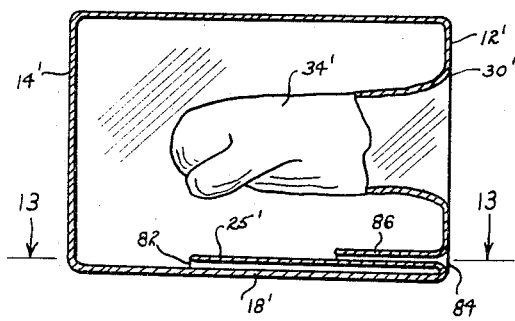
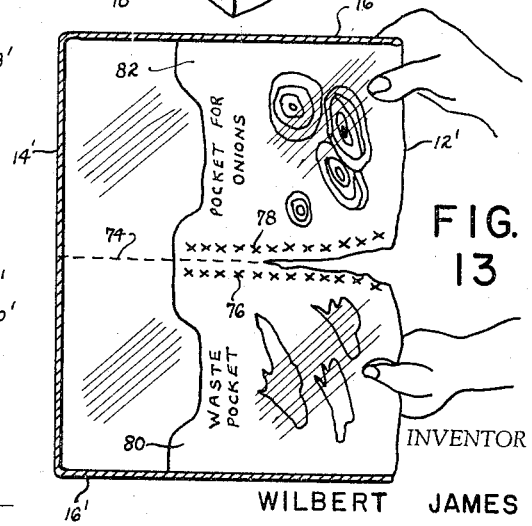

3,354,922
FUMEPROOF, TRANSPARENT ENCLOSURE FOR PREPARING ONIONS
Wilbert James, 492 Convent Ave. Apt. 32,
New York, N.Y. 10031
Filed July 14, 1965, Ser. No. 471,970
1 Claim. (Cl. 146—215)

ABSTRACT OF THE DISCLOSURE

A flexible plastic enclosure for use in preparing food for cooking, such as peeling onions for cooking. The enclosure has top, bottom, front, rear and side walls. The front wall is formed with a pair of spaced round openings. A pair of tubular plastic mittens has one end secured around the openings and extends inwardly to the interior of the enclosure. The inner end of the mittens is open for the insertion of the hands of the operator, an onion, a cutting tool and an onion-supporting tool, whereby the onion is adapted to be peeled inside the enclosure.

---

This invention relates to enclosures for preparing food for cooking and more particularly to an enclosure for use in preparing onions for cooking whereby the eyes and the nose of the operator are protected from the fumes of the onions.

A primary object of the present invention is to provide an enclosure for isolating and confining onions when being peeled and processed for cooking.

Another object of the invention is to provide a kit consisting of enclosures for onions when being peeled and a chopper for chopping the onions.

Yet another object is to provide a device of this character which is collapsible and which can be erected quickly and easily and with a minimum use of tools.

A further object of the invention is the production of such an enclosure for isolating onions which is exceedingly simple in construction, sanitary, transparent to permit full visibility thereof and of the contents thereof, inexpensive to manufacture and yet is highly efficient for the purposes intended.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a top perspective view of a kit consisting of a plurality of enclosures and a chopping device, the kit being made in accordance with the invention, the kit being shown open with an enclosure shown removed and an enclosure shown partly removed, the chopping device being shown removed.

FIG. 2 is a sectional view taken on the line 2—2 of FIG. 1 on an enlarged scale.

FIG. 3 is a top perspective view of an enclosure embodying the invention, the enclosure being shown collapsed with the operator's hands being shown partly in and partly outside the enclosure and showing the chopping device inside the enclosure.

FIG. 4 is a similar view with the chopping device shown inside and onions shown inside and showing the hand of the operator preparatory to placing an onion inside the enclosure.

FIG. 9 is a view similar to FIG. 5 of an enclosure embodying a modified form of the invention.

FIG. 10 is a sectional view taken on the line 10—10 of FIG. 9.

FIG. 11 is a sectional view taken on the line 11—11 of FIG. 9.

FIG. 12 is a fragmentary top perspective view of the bottom wall of the enclosure of FIG. 9.

FIG. 13 is a sectional view taken on the line 13—13 of FIG. 11, parts being shown broken away.

Referring now more in detail to the various views of the drawings, in FIG. 3 an enclosure in the form of a hollow bag for isolating onions while being peeled embodying one form of the invention is shown and designated generally at 10. In FIG. 3 the enclosure is shown in collapsed condition and in FIG. 5 in extended operative condition. The enclosure is formed of sheet transparent flexible plastic material such as polyethylene, cellophane, cellulose acetate or other plastic material in sheet form.

Figure 5:
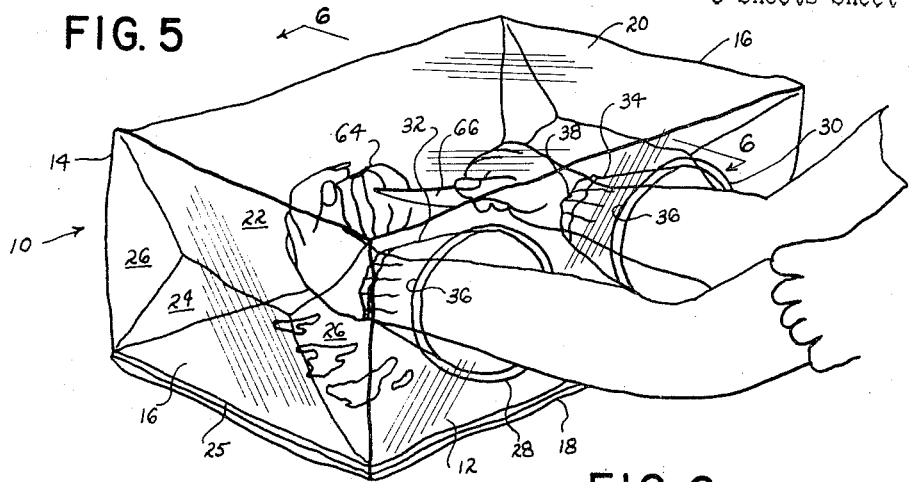
FIG. 5 is a perspective view of the enclosure of FIGS. 3 and 4 in expanded condition, showing the enclosure in actual use in peeling an onion.

The enclosure or bag 10 comprises a hollow plastic body rectangular in configuration, when erected, as seen in FIG. 5 consisting of a front wall 12, rear wall 14, end walls 16, 16, bottom wall 18 and top wall 20. The end walls 16 are composed of overlapped top and bottom flaps 22 and 24, respectively, and side flaps 26, 26. A thin panel 25 of the same plastic material is loosely laid on the bottom wall 18.

In accordance with the invention the front wall 12 is formed with a pair of spaced circular openings 28 and 30. Tapered sleeves 32 and 34 of the same plastic material are secured at their wide ends to the peripheries of the openings 28 and 30, extending inwardly of the interior of the body. The wide ends of the sleeves are formed with annular flanges 36 heat sealed to the edge of the openings. The inner narrow ends of the sleeves are turned over on themselves and sealed forming cuffs 38 which cuffs enclose an elastic band 40 for fastening the end of the sleeve around the wrist of the operator and thereby sealing the sleeve at this point preventing fumes of the onions from escaping.

The invention contemplates marketing the improved enclosure or bag 10 by means of a kit 44 as shown in FIG. 1. This kit comprises a rectangular shaped flexible plastic bag 46 with front and rear walls 48 and 50, respectively, connected at the bottom and narrow side walls 52. The top of the bag is open with a cutaway portion 54 at the top edge of the front wall 48 and a flap 49 formed integrally with the top edge of the rear wall 50, which flap is adapted to be tucked inside the top cutaway portion 54 of the front wall. Identifying indicia 51 may be printed on the front wall 48. A supply of improved enclosures 10 is fitted inside the bag 46 and a chopping board or block 56 is inserted in the bag for supporting the onion when being chopped. The chopping board has a rectangular shaped flat body 58 and an end handle portion 60. The end of the body 58 may be formed with a knife edge 62 for cutting openings, if desired.

Figure 6:
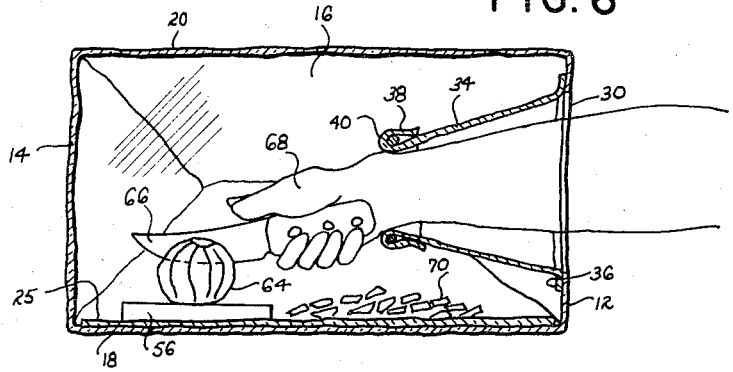
FIG. 6 is a cross-sectional view taken on the line 6—6 of FIG. 5.
Figure 7:
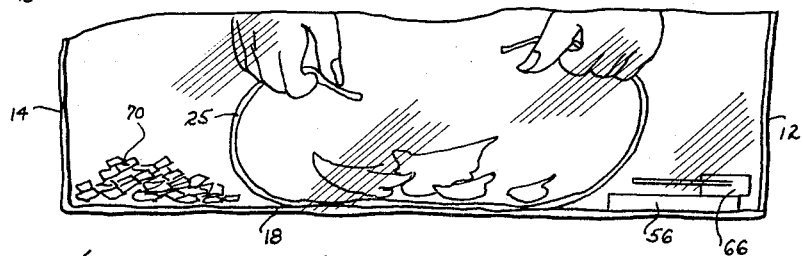
FIG. 7 is a view similar to FIG. 6 showing a step in the processing of the onions for cooking.
Figure 8:
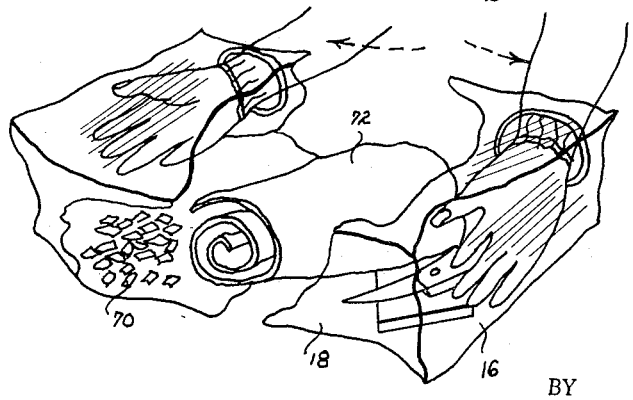
FIG. 8 is a fragmentary top perspective view showing another step in the processing of the onions for cooking.

In use, the enclosure or bag 10 is snapped into open erected or extended condition as shown in FIG. 5, when it is ready for use. The chopping board 56 is next manually inserted inside the enclosure through one of the openings in the front wall 12 and placed flat on the lining panel 25 on the bottom wall 18 between the openings 28 and 30 in front wall 12 and preferably toward the rear wall 14, as best shown in FIG. 6. An onion 64 is then inserted manually through one of the openings in the front wall and placed on top of the chopping block 56 ready to be peeled and cut by means of a knife 66 in the hand 68 of the operator. The onion skins and peels and slices indicated at 70 will fall onto the lining panel 25 which can then be folded up and wrapped around the onion material in the form of a tube 72 as shown in FIG. 8 and readily withdrawn through one of the openings in the front wall. The operation of peeling and cutting the onion takes place inside the enclosure or bag 10 so that no fumes can reach the eyes of the operator.

Referring now to the modified form of enclosure 10' shown in FIGS. 9 to 13, inclusive, the enclosure 10' differs from the enclosure 10 of FIG. 3 in that in place of sleeves 32 and 34, mittens 32' and 34' of plastic material are provided behind the openings 28' and 30', and a tear line 74 is provided centrally of the body of the enclosure 10' for tearing the enclosure in half.

Furthermore, in enclosure 10', instead of the liner panel 25, a panel 25' is provided secured to the bottom wall 18'. Panel 25' ends remote from the rear wall 14'. The panel 25' is heat sealed along lines 76 and 78 on both sides of the tear line 74 on the bottom wall 18' thereby forming pockets 80 and 82. Pocket 80 is adapted to receive the waste onion material and the pocket 82 is adapted to receive the diced or sliced onion portions. An elongated slot 84 is cut in the front wall 12' adjacent the bottom wall 18' and behind said slot is a strip 86 of plastic material extending from side wall 16' to side wall 16' and heat sealed at its ends to the panel 25'. The slot 84 provides an entrance for the chopping board 56 and onions 64, and the strip 86 provides a guide for the movement of the chopping board into the interior of the enclosure 10'. The enclosure 10' is readily cut along the tear line 74 and the pocket 82 with contents saved and the pocket 80 and contents discarded.

In using the enclosure 10', the hands of the operator are placed in the gloves and/or mittens thereby permitting ready handling of the knife, board and onions. The waste skins of the onions can readily be pushed into the pocket 80 and the diced and sliced portions pushed into the pocket 82.

While I have illustrated and described the preferred embodiments of my invention, it is to be understood that I do not limit myself to the precise constructions herein disclosed and that various changes and modifications may be made within the scope of the invention as defined in the appended claim.

What is claimed is:

A fume-proof enclosure comprising, a collapsible, flexible, transparent, plastic hollow body, rectangular in configuration when erected, said body having front side, rear side, end side, top and bottom walls, one of said side walls having a pair of spaced circular entrance openings therein, a pair of tapered plastic sleeves secured at their wide ends to the peripheral edges of said openings, said sleeves extending inwardly of the body, means on the inner ends of the sleeves for sealing the sleeves on the wrists of the hands of an operator inserted into the sleeves, said openings and sleeves serving as entrances for onions to be peeled and cut by the hand of the operator inserted through one of the sleeves, the means for sealing the sleeves on the wrists constituted by cuffs on the inner ends of the sleeves, elastic bands in the cuffs for urging the cuffs around the wrists, a thin, flexible, removable plastic panel on the top surface of the bottom wall for collecting and wrapping the waste onion skins, and reinforcing the bottom wall and a flat chopping board insertible through one of the sleeves to the interior of the body and seatable on the bottom wall for supporting an onion while being peeled and cut and preventing damage to the removable panel and bottom wall.

References Cited

UNITED STATES PATENTS

| D. 161,596 | 1/1951 | Russ | 146—215 X |
| 1,940,078 | 12/1933 | Cooper | 206—70 X |
| 1,977,386 | 10/1934 | Holes | 312—1 |
| 2,039,490 | 5/1936 | Mikelson | 312—1 |
| 2,786,740 | 3/1957 | Taylor et al. | 312—1 |
| 2,819,791 | 1/1958 | Coburn | 206—79 X |

FOREIGN PATENTS 391,399   4/1933   Great Britain.

WILLIAM W. DYER, Jr, *Primary Examiner.*

JAMES M. MEISTER, *Examiner.*